April 18, 1933.  F. E. THOMPSON  1,904,102
CHAIN FASTENER
Filed July 22, 1932
Fig. 1.
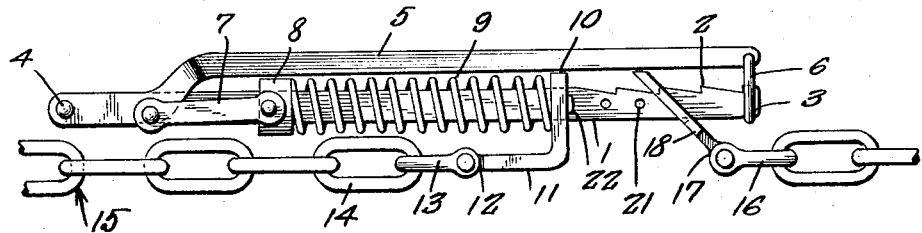
Fig. 2.
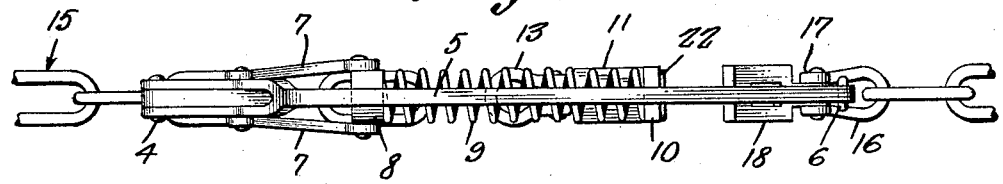
Fig. 3.
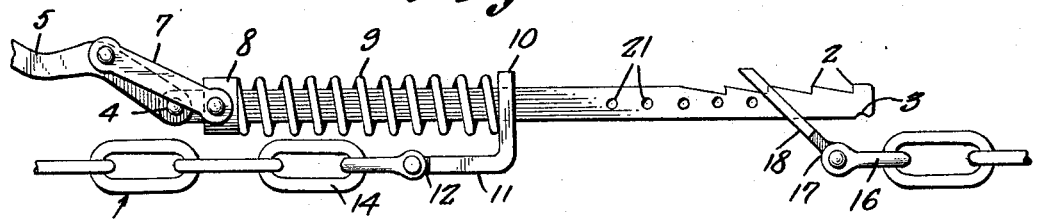
Fig. 4.  Fig. 5.  Fig. 6.
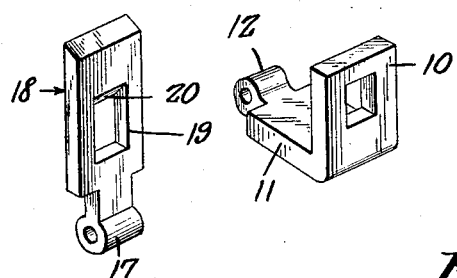 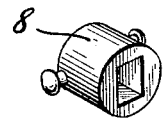
Frank E. Thompson,
INVENTOR
BY Victor J. Evans & Co.
WITNESS: P. C. Hickey.
ATTORNEY Patented Apr. 18, 1933

1,904,102

UNITED STATES PATENT OFFICE

FRANK E. THOMPSON, OF WINONA, MINNESOTA

CHAIN FASTENER

Application filed July 22, 1932. Serial No. 624,092.

My present invention has reference to a tightening and holding device for the end links of chains and particularly to anti-skid chains for automobile tires, and the object of the invention is the provision of a device for this purpose which is characterized by simplicity in construction and reliability and efficiency in practical use.

A further object is the provision of a fastening and holding device for the end links of chains which can easily and quickly be attached to such chains and which is of a construction that any slack in the chain will be taken up regardless of the links of the chain and further wherein the device, when the chain is drawn taut, is detachably secured on the said chain.

To the attainment of the foregoing the invention consists in the improvement hereinafter described and definitely claimed.

In the drawing:

Figure 1 is a side elevation of the improvement.

Figure 2 is a top plan view thereof.

Figure 3 is a side elevation but showing the chain slack before the pressure lever is swung.

Figure 4 is a perspective view of the latch.

Figure 5 is a similar view of one of the end link chain holding slides.

Figure 6 is a similar view of the slidable sleeve.

In carrying out my invention I make use of a flat bar 1. The bar, adjacent to one of its ends, has one of its edges cut to provide the same with any desired number of saw teeth 2. The edge of the bar not provided with the saw teeth 2 has a transverse notch 3 adjacent to its end and the said notch affords a keeper as will hereinafter be set forth.

The second end of the bar has pivoted thereto, as at 4, the bifurcated end of what I will term a pressure lever which is indicated by the numeral 5. The bifurcated end 4 of the lever is offset and the outer or free end of the lever has hung thereon a substantially U-shaped member 6 which is swingable into the keeper notch 3 when the lever 5 is to be latched on the bar 1.

To the arms provided at the bifurcated end of the lever there are pivoted links 7, and these links in turn are pivoted to the sides of a sleeve 8 which has a square bore and which is slidably arranged upon the bar 1. The sleeve 8 affords a contact element for one end of a coil pressure spring 9 which is arranged around the bar 1 and the outer end of the said spring contacts with the plate 10 that has an opening therethrough for the passage of the bar 1. The plate 10 is in the nature of a slide as is the member 8, and the said plate 10 has an angle end 11 provided centrally with an outstanding eye 12 between which are received and to which there is pivoted the arms of a clevis 13 and the said clevis is engaged by one of the end links 14 of a split chain 15. The second end link of the split chain 15 is engaged by another clevis 16 and this clevis has its arms straddling and pivotally secured to an eye 17 formed on the depending portion of a latch plate 18. The latch plate is provided with a substantially rectangular opening 19, for the passage of the bar 1, and what I will term the upper wall provided by the opening 19 is beveled to afford a tooth 20 and which tooth is designed to engage with one of the shoulders between the teeth 2 on the bar 1.

The bar 1, at and adjacent its toothed portion, is provided with any desired number of spaced transverse openings 21 and through one of these openings there is passed a stop element, preferably in the nature of a cotter key 22, the said cotter key limiting the outward movement of the slide 10 on the bar 1.

By thus adjusting the slide 10 the amount of slack taken up in the chain can be regulated as will be presently apparent.

In operation the lever 5 is swung to the position disclosed by Figure 3 of the drawing. This retracts the sleeve 8 and draws upon the slide 10 to partly depress the spring 9 between the said elements 8 and 10. As the chain is in a slack condition the second end thereof, carrying the latch 18, permits of the latch being moved over the bar 1 to allow its tooth 20 to engage with the desired shoulder between two of the saw teeth 2. When the chain is thus attached to the bar the lever 5 is swung over the bar, to the position disclosed by Figures 1 and 2 of the drawing. This swinging of the lever will cause the same to exert a pushing action upon the links 7 and consequently upon the sleeve 8 and will permit the expansion of the said spring so that the slide is moved by the spring along the bar until the same contacts with the cotter pin or like stop element 22. The bail member 6 is swung over the bar 1 to engage in the keeper notch 3 so that the lever is latched to the bar. To remove the chain the operation just described is reversed.

While I have illustrated a satisfactory embodiment of my improved device my features of invention are capable of extended application and I do not wish to be limited to the specific structure herein shown and described.

Having described the invention, I claim:

1. In a device for the purpose set forth, a bar having teeth on one of its edges from one of its ends, a swingable lever pivoted to the non-toothed end of the bar, links carried by the lever, a sleeve movable on the bar and to which the links are connected, a spring on the bar having one end contacting with the sleeve, a slide on the bar with which the second end of the spring contacts, said slide having an angle portion, a split chain having one of its edges swingably secured to the angle portion of the slide, a latch plate pivotally secured to the second end link of the chain, said latch plate having a substantially rectangular opening to receive the bar therethrough, and the end wall provided by the opening opposite the teeth of the bar having a tooth to engage with one of the teeth of the bar, and means for latching the lever to the toothed end of the bar when swung thereover, all as and for the purpose set forth.

2. A device according to claim 1, in which the lever has an offset and bifurcated end which is pivoted to the bar and to which the links are pivoted, the bar having a notched edge, the lever having a swingable yoke to engage the notch when the lever is swung over the bar and the bar having spaced openings for the reception of a stop element for the slide.

In testimony whereof I affix my signature.

FRANK E. THOMPSON.